US006813316B2

(12) United States Patent
Lohr

(10) Patent No.: US 6,813,316 B2
(45) Date of Patent: Nov. 2, 2004

(54) ARRAY FOR THE TRANSMISSION OF ELECTRICAL ENERGY OR SIGNALS

(75) Inventor: Georg Lohr, Eichenau (DE)

(73) Assignee: Schleifring und Apparatebau GmbH (DE)

( * ) Notice: Subject to any disclaimer, the term of this patent is extended or adjusted under 35 U.S.C. 154(b) by 0 days.

(21) Appl. No.: 10/273,988

(22) Filed: Oct. 18, 2002

(65) Prior Publication Data

US 2003/0091118 A1 May 15, 2003

Related U.S. Application Data

(63) Continuation of application No. PCT/DE01/01499, filed on Apr. 18, 2001.

(51) Int. Cl.[7] ................................................. H04B 5/02
(52) U.S. Cl. ....................................... 375/258; 375/259
(58) Field of Search ............................... 375/258, 259; 363/20; 307/109; 455/41.1

(56) References Cited

U.S. PATENT DOCUMENTS

| | | | | |
|---|---|---|---|---|
| 5,019,813 A | * | 5/1991 | Kip et al. ................. | 340/10.51 |
| 5,859,873 A | * | 1/1999 | Ritter ........................ | 375/259 |
| 6,040,986 A | * | 3/2000 | Sakamoto et al. ....... | 363/21.02 |
| 6,351,626 B1 | * | 2/2002 | Lohr .......................... | 455/41.1 |
| 6,567,394 B1 | * | 5/2003 | Arisawa ..................... | 370/343 |
| 6,615,023 B1 | * | 9/2003 | Ehrensvard ................ | 455/41.1 |

OTHER PUBLICATIONS

Overview of different alternatives for the contact–less transmission of energy;Fernandez, C.; Garcia, O.; Prieto, R.; Cobos, J.A.; Uceda, J.; IECON 02, vol.: 2, Nov. 5–8, 2002, pp.: 1318–1323 vol. 2.*

* cited by examiner

*Primary Examiner*—Stephen Chin
*Assistant Examiner*—Cicely Ware
(74) *Attorney, Agent, or Firm*—St. Onge Steward Johnston & Reens LLC

(57) ABSTRACT

What is described here is an array for the transmission of electrical energy or signals, respectively, between a base station and several external units adapted to be coupled, without contact, to various positions on said base station.

The invention is characterised by the provisions that the primary side circuitry of a power supply with potential isolation is provided on each connecting position of the central unit, and that each of said external units includes the corresponding circuitry of the secondary side, with the power transmission being realised via an inductive coupler element that replaces the transformer that is usually used in such a power supply, and that the feedback signals are transmitted by means of a further non-contacting coupler element from said external units back to said base unit.

8 Claims, 2 Drawing Sheets

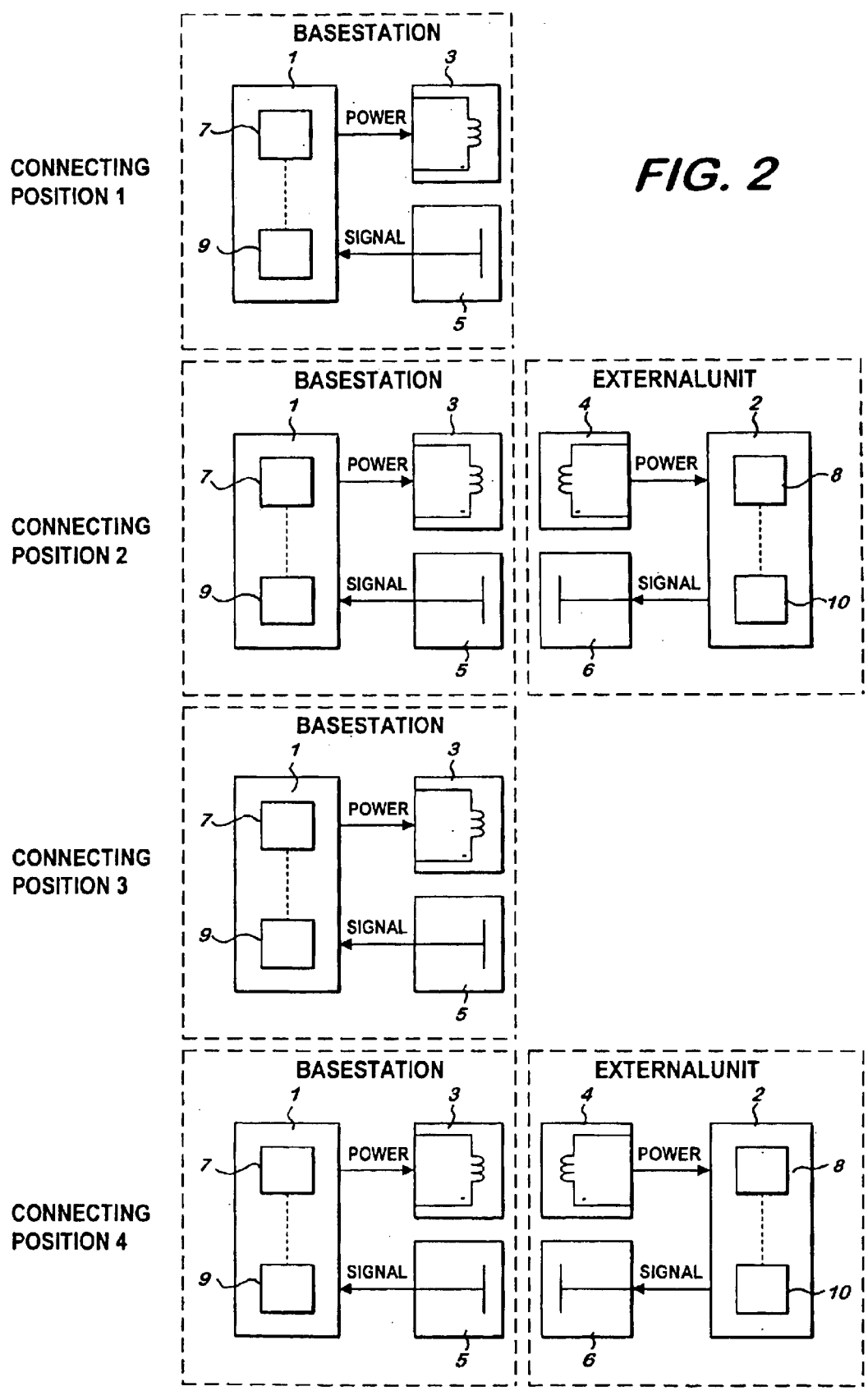

ARRAY FOR THE TRANSMISSION OF ELECTRICAL ENERGY OR SIGNALS

This application is a continuation of pending International Application No. PCT/DE01/01499 filed Apr. 18, 2001, which designates the United States and claims priority from pending German Application Nos. 10019371 filed Apr. 18, 2000 and 10026173 filed May 26, 2000.

FIELD OF THE INVENTION

The present invention relates to an array for the transmission of electrical energy or signals, respectively between a base station and several external units adapted to be coupled without contact to various positions on the base station.

PRIOR ART

Mechanical plug-and-socket connectors are frequently employed for contacting frequently mobile means. Such mechanical contact systems are commercially available in a very wide variety of types and models. As a rule, a comparatively high expenditure is required in order to protect the contact systems from influences from the environment. Here, aspects such as touch-preventing guards, protection from penetrating liquids such as water, oil or even moisture play an important role.

Particularly high demands prevail in areas protected from explosion. In order to satisfy such requirements it is necessary to encapsulate the contact means in a complex and high-cost manner. As a consequence, the structure is substantially changed whilst handling is rendered more difficult. Specifically with frequent plugging and unplugging cycles, such plug-and-socket connectors present serious disadvantages.

Contact-less connecting systems constitute a substantial improvement here. Non-contacting transmission systems, which are based on inductive coupling, are known in manifold configurations. One example of a system based on inductive coupling is described in the German Patent 197 01 357 A1. It avoids the principal disadvantage of contacting systems but it entails comparatively high production costs. There, a separate AC voltage generator and, on the opposite side, a corresponding rectifier are necessary for each transmission system. This results in intolerable high costs particularly in installations with a high number of contacting means.

Further systems are known from the German Patent DE 44 36 592 C2, the German Patent DE 196 48 682 A1 or the German Patent DE 197 35 685 A1.

BRIEF DESCRIPTION OF THE INVENTION

The invention is based on the problem of proposing an array for contact-less transmission, which can be realised at low costs specifically in a high number of transmission sites.

One inventive solution to this problem is defined in Patent Claim 1. Improvements of the invention are the subject matters of the dependent claims.

This inventive array is composed of one respective switching controller per contact site.

The inventive array consists particularly of a fixed-cycle power supply for potential-free transmission of energy, with the potential-isolating elements being designed as contact-less transmission means. Potential-isolating power supply units in correspondence with prior art are provided, as a rule, with a power switching stage on the primary side, which generates an alternating voltage. This voltage is then transmitted to the secondary side by means of a potential-isolating transformer. There the output parameters are rectified and measured. A feedback signal is generated from these output parameters, in its turn, which is transmitted in a potential-free manner to the primary side for control of the power generator. Such arrays are provided with two paths in which potential isolation is required. On the one hand, this is the path of the power flow from the primary side to the secondary side, and, on the other hand, this is the feedback path for control of a constant output parameter from the secondary side to the primary side. In an inventive contact-less transmission means, now both potential-isolating paths are replaced by non-contacting transmission elements. In the case of the power path, the potential-isolating transformer—which is provided anyhow—is split into two parts whereof each contains a winding and a ferrite or iron core, respectively, for controlling the magnetic flux. It is now possible to separate the primary and the secondary sides from each other and to re-assemble them in a simple manner. In the case of a feedback path, with potential isolation, from the secondary side to the primary side the transmission is preferably realised via a capacitive coupler element. As an alternative, this information may also be transmitted with an inductive or optical technique. Preferred capacitive coupler elements are the subject matter of the German Patent Application DE 197 00 110 A1.

In a particularly expedient embodiment of the invention, the circuit is designed as a resonance transducer for the transmission of energy. Such transducers present essential advantages here. Transformers that can be split and where the primary and secondary sides may be separated from each other display a variable leakage inductance due to the mostly varying air gap between the primary and secondary sides. Due to its impedance, this leakage inductance restricts the flow of current in the transformer. When this leakage inductance is compensated by a corresponding capacitance an optionally low impedance can be achieved in the case of resonance. By virtue of their utilising this effect, resonance transducers are able to operate with a substantially higher efficiency here.

Another embodiment of the invention consists in the aspect that these capacitive coupler elements are disposed in the immediate coupling range of the inductive coupler elements. Such an arrangement permits a substantially space-saving structure because additional space is not required for the capacitive coupling means. Such an arrangement of the capacitive coupler elements in the magnetic field of the inductive transmission means allows for independent transmission of both signals.

This is possible without any problems in the inventive array because electrical fields and magnetic fields do not take an influence on each other.

When in another expedient design of the invention the capacitive coupling means is designed here in the form of a pc board it offers additional mechanical protection for the inductive coupling means. In distinction from the array represented in the laid-open German Patent Application DE 4125145, the inventive array provides for a complete cover of the inductive coupler element.

BRIEF DESCRIPTION OF THE DRAWING

The invention will be described in the following by exemplary embodiments, without any restriction of the general inventive idea and with reference to the drawing to which explicit reference is made, by the way, as far as the disclosure of all inventive details is concerned which are not explained more exhaustively in the text. In the drawing.

DESCRIPTION OF THE DRAWINGS

Figure 1:
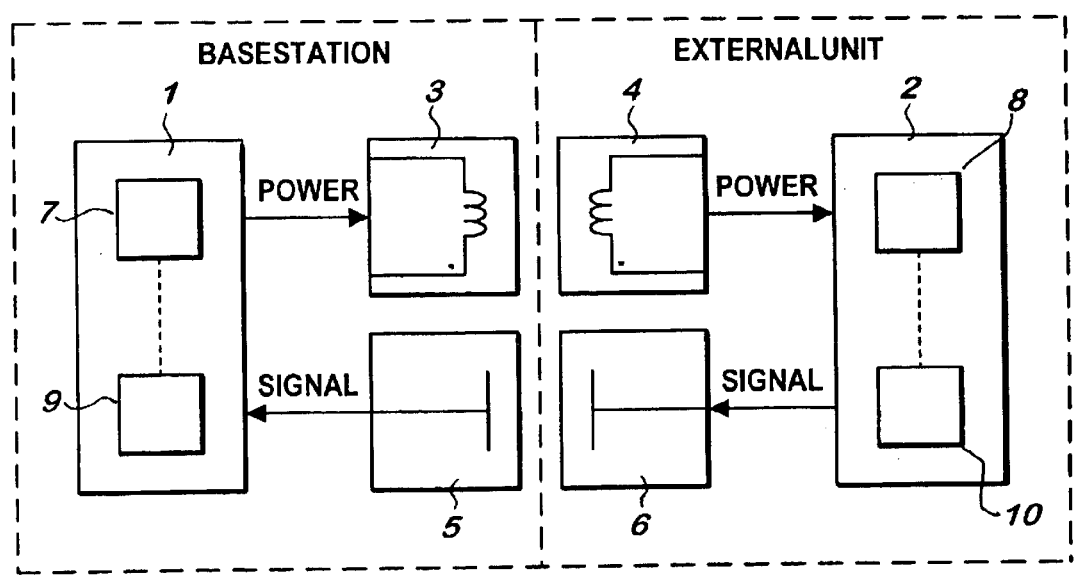
FIG. 1 illustrates an exemplary block diagram of an inventive array.

Shown schematically in FIG. 1 is a base station and one external unit coupled to the base station. Base station circuitry 1 comprises a power supply 7 connected to a transmitting side 3 of a non-contacting inductive first coupler element, and control means 9 for controlling the power supply 7 in accordance with feedback signals received via a receiving side 5 of a non-contacting second coupler element shown as a capacitive coupler element. The external unit comprises a receiving side 4 of the non-contacting inductive first coupler element for receiving power from the transmitting side 3 of the inductive first coupler element. External unit circuitry 2 comprises means 8 for measuring a parameter of power received from the base unit, and means 10 for generating feedback signals from the measured parameter. The feedback signals are conducted to a transmitting side 6 of the non-contacting second coupler element for transmission to the receiving side 5 and from there to the control means 9 for the power supply 7. The potential of the base station circuitry 1 is kept separated from that of the external unit circuitry 2 by means of the non-contacting elements.

FIG. 2 shows an arrangement according to the invention, where the base station has a plurality of connecting positions, shown as connecting positions 1 to 4, to each of which one of a plurality of external units may be coupled without contact.

What is claimed is:

1. An arrangement for non-contact transmission of electrical energy or signals between a base station having a plurality of connecting positions and a plurality of external units each adapted to be coupled without contact to a connecting position of the base station, in which:

each connecting position of the base station comprises:
        a power supply for generating power to be transmitted to an external unit coupled to the base station at the connecting position;
        a transmitting side of an inductive non-contacting first coupler element for receiving power supplied from the at least one power supply and coupling energy to the external unit coupled to the base station at the connecting position;
        a receiving side of a non-contacting second coupler element for receiving feedback signals from the external unit coupled to the base station; and
        a controller for controlling the constancy of at least one parameter of the power supply according to the received feedback signals;

each external unit comprises:
        a receiving side of the inductive first coupler element adapted to be coupled without contact to the transmitting side of the inductive first coupler element, a potential of the receiving side of the inductive first coupler element being separate from that of the transmitting side;
        means for measuring at least one parameter of the power received by the receiving side of the inductive first coupler element;
        means for generating feedback signals from the at least one parameter of the power received by the receiving side of the inductive first coupler element; and
        a transmitting side of the non-contacting second coupler element for transmitting the feedback signals to the receiving side of the second non-contacting coupler element, a potential of the transmitting side of the non-contacting second coupler element being separate from that of the receiving side; and
        the non-contacting second coupler element for transmitting the feedback signals to the base station is one of: an inductive coupler element, a capacitive coupler element or an optical coupler element.

2. The arrangement according to claim 1, wherein circuitry of each connecting position of the base station for the transmission of energy from the base station to the at least one external unit is designed to form a resonance converter.

3. The arrangement according to claim 1, wherein the non-contacting second coupler element for transmitting the feedback signals to the base station is a capacitive coupler element and is disposed within the range of a magnetic field of the non-contacting inductive first coupler element.

4. The arrangement according to claim 1, wherein the non-contacting second coupler element for transmitting the feedback signals to the base station is a capacitive coupler element and is incorporated in a pc board which constitutes a mechanical cover for the non-contacting inductive first coupler element.

5. A system for non-contacting transmission of energy between a base station and an external unit coupled to a connecting position of the base station comprising:
    a power transmission coupler located in the base station and electrically coupled to a power supply for transmitting electrical energy from the base station to the external unit;
    a power receiving coupler located in the external unit for receiving the electrical energy transmitted by said power transmission coupler;
    a feedback circuit located in the external unit and coupled to said power receiving coupler to measure at least one parameter of the electrical energy received by said power receiving coupler and for generating a feedback signal based upon the measured parameter;
    a signal transmission coupler located in the external unit and electrically coupled to said feedback circuit to transmit the feedback signal from the external unit to the base station;
    a signal receiving coupler located in the base station for receiving the feedback signal transmitted by said signal transmission coupler;
    a controller electrically coupled to the power supply for dynamically controlling at least one parameter of the electrical energy generated by the power supply based upon the feedback signal.

6. The system according to claim 5 wherein said power transmission coupler and said power receiving coupler comprise inductive coupler elements.

7. The system according to claim 5 wherein said power transmission coupler and said power receiving coupler comprise capacitive coupler elements.

8. The system according to claim 5 wherein said power transmission coupler and said power receiving coupler comprise optical coupler elements.

* * * * *